United States Patent
Spruit et al.

(10) Patent No.: US 7,330,415 B2
(45) Date of Patent: Feb. 12, 2008

(54) OPTICAL RECORD CARRIER RECORDING METHOD AND RECORDING APPARATUS

(75) Inventors: Johannes Hendrikus Maria Spruit, Eindhoven (NL); Johannes Josephus Leonardus Maria Van Vlerken, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 248 days.

(21) Appl. No.: 10/495,286

(22) PCT Filed: Oct. 18, 2002

(86) PCT No.: PCT/IB02/04339

§ 371 (c)(1),
(2), (4) Date: May 12, 2004

(87) PCT Pub. No.: WO03/042986

PCT Pub. Date: May 22, 2003

(65) Prior Publication Data

US 2004/0257951 A1  Dec. 23, 2004

(30) Foreign Application Priority Data

Nov. 15, 2001  (EP) ................................. 01204361

(51) Int. Cl.
*G11B 7/00* (2006.01)

(52) U.S. Cl. ................................. 369/59.11; 369/59.12

(58) Field of Classification Search ...................... None
See application file for complete search history.

(56) References Cited

U.S. PATENT DOCUMENTS

| | | | | |
|---|---|---|---|---|
| 5,602,806 | A * | 2/1997 | Arnett et al. | 369/13.24 |
| 5,642,343 | A * | 6/1997 | Toda et al. | 369/47.53 |
| 5,715,228 | A * | 2/1998 | Takiguchi | 369/116 |
| 5,825,742 | A * | 10/1998 | Tanaka et al. | 369/59.11 |
| 5,859,813 | A * | 1/1999 | Itakura et al. | 369/13.24 |
| 6,345,026 | B1 * | 2/2002 | Furukawa et al. | 369/59.11 |
| 6,426,930 | B2 * | 7/2002 | Tanaka et al. | 369/59.12 |
| 6,442,118 | B1 * | 8/2002 | Hoshino et al. | 369/47.51 |
| 7,027,371 | B2 * | 4/2006 | Nobukuni et al. | 369/47.54 |

\* cited by examiner

*Primary Examiner*—Thang V. Tran

(57) ABSTRACT

In an optical record carrier recording method for forming marks and lands by irradiating a radiation beam onto a recording surface of an optical record carrier, the radiation beam for each mark to be recorded is set to at least one write power level ($P_w$) capable of forming a mark during a mark period (31) and, for each land between the marks, to at least one bottom power level ($P_0$) incapable of forming a mark during a land period (32). When recording a wobble signal on the record carrier, in order to achieve a better wobble signal-to-noise ratio during writing, the bottom power level ($P_0$) is temporarily raised to an intermediate power level ($P_i$) during an intermediate period (34). Preferably, the intermediate power level ($P_i$) is set within a range of from 1.5 to 6, in particular, from 2 to 4, times the bottom power level ($P_0$).

8 Claims, 2 Drawing Sheets

OPTICAL RECORD CARRIER RECORDING METHOD AND RECORDING APPARATUS

BACKGROUND OF THE INVENTION

1. Field of the Invention

The invention relates to a record carrier recording method for forming marks and lands on a recording surface of the record carrier by irradiating a radiation beam onto the recording surface of the record carrier, the radiation beam, for each mark to be recorded, being set to at least one constant or pulsed write power level capable of forming a mark during a mark period and, for each land between the marks, to at least one bottom power level incapable of forming a mark during a land period. The invention also relates to a corresponding record carrier recording device for carrying out such a method.

A mark is understood to be any area on the recording surface having optically detectable properties which differ from the properties in the surrounding land area. Examples of such a mark are a pit in an even surrounding area or an amorphous area in a crystalline surrounding area.

2. Description of the Related Art

A recording method according to the preamble is known from the Compact Disc Recordable (CD-R) system description (also known as the Orange-Book). A mark (in this case being a pit) is formed by irradiating a radiation beam having a write power level onto a recording surface of an optical record carrier during a mark period. The time length of the mark period depends on the length of the mark to be recorded. The length of a mark is represented by a parameter nT, where T represents the time length of one period of a reference clock in a data signal and n represents a predetermined integer number. For a CD-R system, n is in a range of from 3 to 11. For forming a land, the radiation beam is set to a bottom power level which is lower than the write power level during a land period.

The setting of the radiation beam to the bottom power level during the land period when writing a recordable optical medium (CD, DVD, etc.) involves problems. Due to the low bottom power level, the intensity reflected back from the record carrier to a detector fluctuates significantly during the writing process. When writing a mark, much more light falls on the detector as compared to reading in between the marks. This has a particular drawback for the detection of a wobble signal derived from a pre-pressed groove in a record carrier. Such a wobble signal is often used for storing addressing information, auxiliary data, such as, for example, write strategies, or data to be protected against unauthorized access, for example, encryption keys, on the record carrier.

For DVD-recordable (such as DVD+R), it can be seen that the wobble signal is most difficult to detect during writing. Because the wobble causes jitter in the HF channel of DVD+R media, it is, on the one hand, desired to have the wobble amplitude as low as possible. However, on the other hand, for a good wobble detection, it is desired to have the wobble signal-to-noise ratio (S/N ratio) as high as possible, which implies a high wobble amplitude. It is, therefore, desired to increase the wobble signal-to-noise ratio during writing without increasing the wobble amplitude.

The detection of the reflected bottom power level is required for a continuous optimization of the power of the radiation beam during the recording operation (often called Running Optimum Power Control (ROPC) or alpha control). This ROPC controls the recording powers such that the effects are always properly written, even in the case of, for example, fingerprints on the surface of a recording disc. However, at higher disc velocities, this detection of the reflected bottom power level becomes more difficult, because the bottom power level is relatively low compared to the write power level.

An additional problem appears during writing on recordable media where servo signals are generated by sampling the bottom power level. At higher write speeds, the noise/disturbance levels in a drive will increase.

SUMMARY OF THE INVENTION

It is, therefore, an object of the present invention to provide a record carrier recording method and a corresponding apparatus which overcome the above-mentioned problems. It is a particular object of the present invention to achieve a better wobble signal-to-noise ratio (S/N ratio) during writing and to improve the signal quality at sampling of the bottom power levels.

This object is achieved by an optical record carrier recording method for forming marks and lands on a recording surface of the record carrier by irradiating a radiation beam onto the recording surface of the record carrier, the radiation beam for each mark to be recorded being set to at least one constant or pulsed write power level (Pw) capable of forming a mark during a mark period (31) and for each land between the marks to at least one bottom power level (P0) incapable of forming a mark during a land period (32), which is characterized in that the bottom power level is raised to an intermediate power level during an intermediate period. In a preferred embodiment of the method according to the invention, said intermediate power level is set within a range of from 1.5 to 6, in particular, from 2 to 4, times the bottom power level.

The object is also achieved by an optical record carrier recording device for recording data in the form of marks and lands on a recording surface of the record carrier by irradiating a radiation beam onto the recording surface of the record carrier, the recording device comprising a radiation source for providing a radiation beam and also control means, such a recording device is characterized in that the control means is operative for controlling the power of the radiation beam such that the bottom power level is raised to an intermediate power level during an intermediate period. In a preferred embodiment of the recording device according to the invention, said intermediate power level is set within a range of from 1.5 to 6, in particular, from 2 to 4, times the bottom power level.

The present invention is based on the idea to keep the light reflected onto the detector during the mark periods for forming marks and in between said marks periods, that is, during the land periods, at a more constant level, which is particularly favorable for wobble detection and for normation signal used during a Running Optimum Power Control (ROPC). Therefore, it is proposed, according to the invention, to increase the bottom power level to an intermediate power level higher than the bottom power level but lower than the write power level during an intermediate period which is shorter than the land period. This results in a better wobble signal-to-noise ratio (S/N ratio) during writing, because the cross-talk of the EFM spectrum is reduced. Furthermore, a higher bottom power level will improve the signal quality at sampling of lands.

By increasing the bottom power level during the complete land period, the jitter is affected as well. Therefore, the bottom power level is preferably raised to the intermediate power level only during an intermediate period being located in the middle of said land period. According to a further preferred embodiment, at the start and/or the end of the land period, the bottom power level remains stable for a time length of at least 0.5T, in particular, for a time length between 1T and 2T, where T represents the time length of one period of a reference clock in a data signal, while during the remainder of the land period, the bottom power level is raised to the intermediate power level. In an advantageous embodiment, the bottom power level is raised to the intermediate power level only in the area of 1.5T after the last mark period to 1.5T before the next mark period.

It has been found that the bottom power level can be increased by a factor of at least 1.5 to 6 times during said intermediate period. As a particular example, a bottom power level of 0.7 mW could be increased to 2 mW with negligible effect on the jitter. Somewhat higher intermediate power levels, for example, up to 4 mW, are also possible in general, but in that case, the length of the land period between the previous and the next mark should probably be enlarged.

If, during the land start period and/or the land end period, the bottom power level remains at its level, particularly when it is only raised to the intermediate power level in between the land start period and the land end period, each having a time length of at least 1T, the bottom power level during the land start period and/or the land end period can even be further reduced, if desired, for the best write performance. This was not possible in known write strategies for recordable optical media because of the problems explained above. The bottom power level during the intermediate period, that is, the intermediate power level, can thus be even further increased, for example, by the factor of two, without adversely affecting the jitter.

According to a further embodiment of the invention, it is proposed that the level of said intermediate power level and the duration of said intermediate period are controlled such that the signal-to-noise ratio of a data signal read from the record carrier is increased. Particularly when using the invention for recording a wobble signal on the record carrier, the wobble signal-to-noise ratio, when detecting the wobble signal by a recording device, has to be increased. In a measurement of the wobble signal-to-noise ratio, the power, as measured in a certain bandwidth at the main wobble carrier frequency, is divided by the power of the noise at a frequency close to the main frequency.

Preferably, the optical record carrier recording device comprises jitter control means for minimizing the jitter by controlling the power of the radiation beam and/or the duration and time length of the power levels. A Running Optimum Power Control (ROPC) can be implemented by said jitter control means. The basic idea behind this ROPC is that it measures the reflected light during writing at the end of the long marks which are being written. When the writing is performed with too low a power, marks are not generated well and the reflected light increases. When the marks are being written with too high a power, the marks are written too broad and the reflected light decreases. However, the reflected light itself is not a good measure, because irregularities on the record carrier, such as, for example, a fingerprint, will also influence the amount of reflected light. Therefore, the reflected light is normalized to the amount of reflected light in between the marks. For a reliable ROPC, the reflected light in between the marks as well as the reflected light during the writing of the marks must be accurately measured. At higher disc speeds, where the ratio of write power to bottom power increases, this may become difficult when an analog-to-digital converter is used which may not clip. Therefore, the increase of the bottom power level to the intermediate power level, as proposed according to the present invention, improves the accuracy of the measurement during a Running Optimum Power Control.

It will be apparent to a person skilled in the art that the invention is not limited to a specific kind of optical recording medium but can be applied to any kind of optical recording medium, especially write-once optical recording media, and in corresponding optical recording systems.

BRIEF DESCRIPTION OF THE DRAWINGS

The invention will now be explained in more detail, by way of example, with reference to the drawings in which.

DESCRIPTION OF THE PREFERRED EMBODIMENTS

Figure 1:
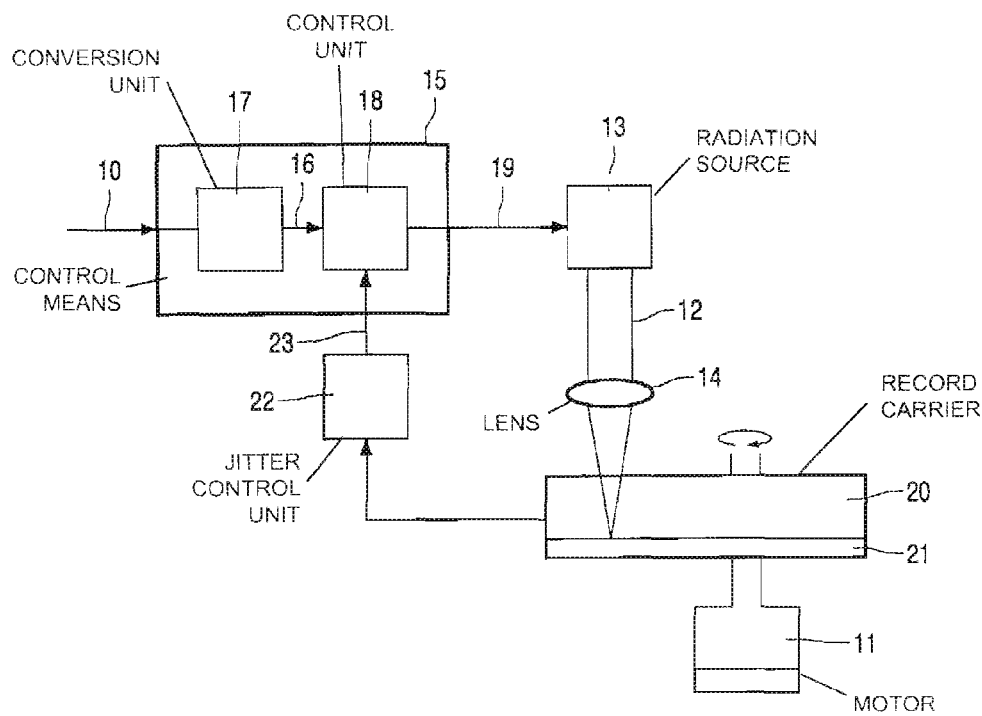
FIG. 1 shows an embodiment of a recording device according to the invention.

FIG. 1 shows an optical record carrier recording device according to the invention for recording a data signal 10 onto the recording surface 21 of a disc-shaped optical record carrier 20. The optical record carrier 20 is rotated around its center by a motor 11. A radiation beam 12 is generated by a radiation source 13 and focussed onto the recording surface 21 by a lens 14. The data signal 10 is inputted into control means 15. Therein, the data signal 10 is converted into a control signal 16 by a conversion unit 17 and is inputted into a control unit 18. Therein, a radiation control signal 19 is generated for controlling the radiation power to be generated by the radiation source 13.

In order to control the power of the radiation beam 12 and the duration and time length of the power levels such that the wobble signal-to-noise ratio is increased without adversely affecting the jitter, a jitter control unit 22 may be provided for measuring the jitter after the writing of signals on the optical record carrier 20, the jitter control unit 22 minimizing the jitter in a data signal read from the record carrier by controlling the power of the radiation beam and/or by controlling the duration and time length of the power levels. Said measurement and control are performed by said jitter control unit 22 while writing the signal on the optical record carrier 20. The jitter control unit 22 generates a jitter control signal 23 which is also inputted to said control unit 18.

Figure 2:
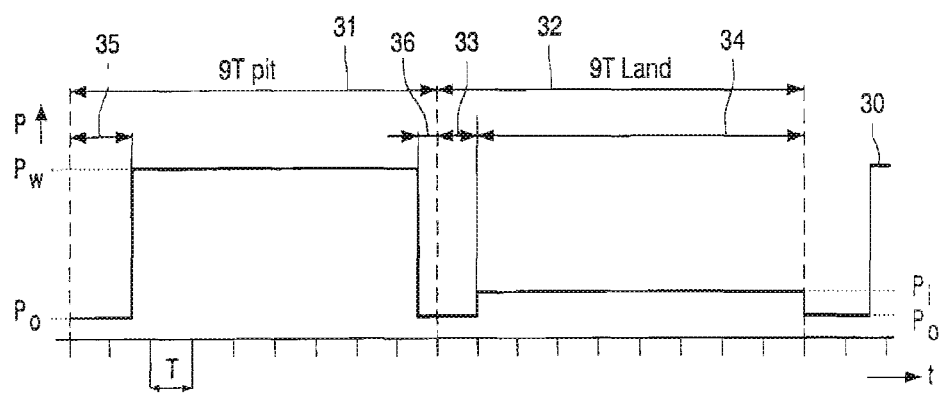
FIG. 2 shows a first write signal according to the invention.

FIG. 2 shows an example of a proposed write strategy according to the invention. Therein, a write strategy for forming an I9 mark and an I9 land is illustrated, I9 meaning a mark and a land, respectively, having a run length of 9T. A write signal 30 is shown having different power levels P over time t. For writing a 9T mark, the radiation beam is set to a write power level $P_w$ for most of the time of a mark period 31, except for an initial mark start period 35 and a mark end period 36 during which the radiation beam is set to a bottom power level $P_0$. For subsequently forming a 9T land, the radiation beam is first set to the normal bottom power level $P_0$ during the land start period 33 and, for the remaining time of the land period 32, that is, during the intermediate period 34, the power level of the radiation beam is increased to an intermediate power level $P_i$. When, subsequently, the next mark is to be recorded, the radiation beam is set again to the normal bottom power level $P_0$.

For writing marks and lands on a DVD+R, the normal bottom power level $P_0$ is generally about 0.7 mW. The intermediate power level could be increased within a range of from 1.5 to 6, in particular, within a range of from 2 to 4 times the bottom power level. In the present case, for writing a 9T land, an intermediate power level $P_i$ of from 1.4 mW up to 2.0 mW would offer a good result, that is, an increase in the wobble signal-to-noise ratio without adversely affecting the jitter too much.

Figure 3:
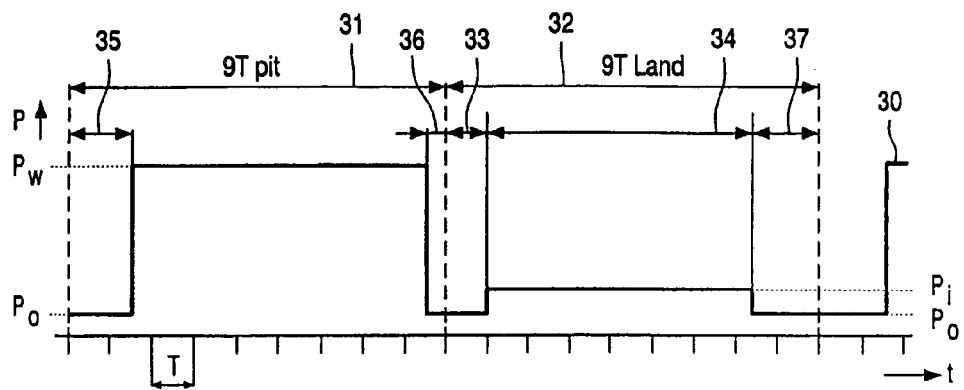
FIG. 3 shows a second write signal according to the invention.

As can be seen in FIG. 2, the land start period 33 has a duration of about 1T while the remaining intermediate period 34 has a time length of, for example, 8T. More generally, the land start period 33 should preferably be set in a range of from 1 to 2T. Additionally, a land end period 37 having a time length in the same range, as shown in the example of FIG. 3 where it has a time length of 1.5T, could be provided. The time length of the land start period 33 and of the land end period 37 may be equal or unequal. A small adverse effect on the jitter is achieved when both of said periods 33 and 37 are set to a time length of 1.5T.

Figure 4:
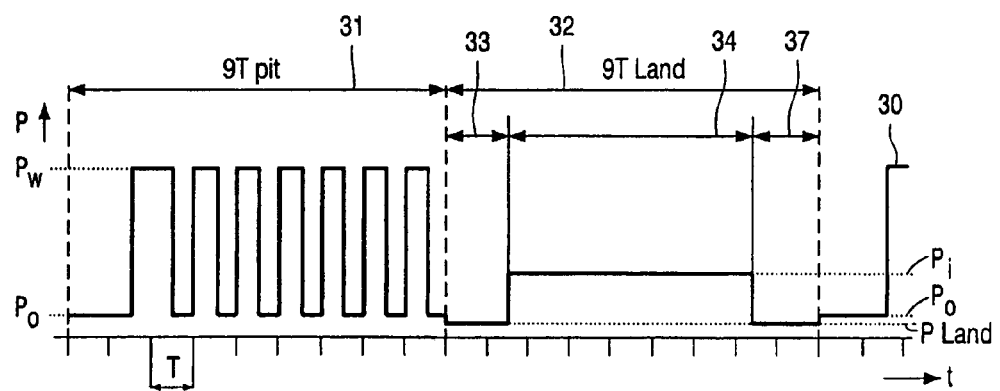
FIG. 4 shows a third write signal according to the invention.

While the invention is especially useful for recording signals on write-once optical media, like CD-R, DVD-R and DVD+R, it is, in general, also possible to use the invention for all other optical recording media, such as rewritable media. The invention is generally applicable when using a pulse-based writing strategy as shown in FIG. 4. Therein, when writing a mark, instead of keeping the radiation beam constant at the write power level $P_w$, the write signal 30 is pulsed, that is, the radiation beam is switched between the write power level $P_w$ and a lower power level, such as the bottom power level $P_0$. Subsequently, for forming a land, the invention is used as explained above, that is, during a land start period 33 and a land end period 37, the radiation beam is set to the bottom power level, while during the remaining intermediate period 34, the radiation beam is set to the intermediate power level $P_i$. Alternatively, during the land start period 33 and the land end period 37, the radiation beam is set to a land power level $P_{land}$ even lower than the bottom power level $P_0$ as is shown in FIG. 4. The land start period 33 and the land end period 37 both have a time length of 1.5T. In this case, the radiation beam can be set to the lowered land power level $P_{land}$ for the best write performance.

When the write strategy according to the invention is used for recording a wobble signal onto the record carrier, it offers a significant increase in the wobble signal-to-noise ratio (S/N ratio) during writing. While for a conventional write strategy, using a bottom power level of $P_0=0.7$ mW, a S/N ratio of 41 dB is obtained, applying the write strategy according to the invention results in a S/N ratio of 44 dB during writing. This may either be used for more reliable wobble detection or for a reduction of the wobble amplitude which results in better jitter values of the HF signal. Thus, the use of a higher light level between the pits, offers better wobble signals, better servo signals and a more accurate reference for the ROPC method.

The invention claimed is:

1. A record carrier recording method for forming marks and lands on a recording surface of the record carrier by irradiating a radiation beam onto the recording surface of the record carrier, said recording method comprising the steps of:
setting the radiation beam, for each mark to be recorded, to at least one constant or pulsed write power level capable of forming a mark during a mark period; and
setting the radiation beam, for each land between the marks, to at least one bottom power level incapable of forming a mark during a land period,
wherein the method further comprises the step of:
raising the bottom power level to an intermediate power level during an intermediate period,
characterized in that said intermediate power level is set within a range of from 1.5 to 6, in particular, from 2 to 4, times the bottom power level.

2. A record carrier recording method for forming marks and lands on a recording surface of the record carrier by irradiating a radiation beam onto the recording surface of the record carrier, said recording method comprising the steps of:
setting the radiation beam, for each mark to be recorded, to at least one constant or pulsed write power level capable of forming a mark during a mark period; and
setting the radiation beam, for each land between the marks, to at least one bottom power level incapable of forming a mark during a land period,
wherein the method further comprises the step of:
raising the bottom power level to an intermediate power level during an intermediate period,
characterized in that during a land start period and/or a land end period of said land period, the radiation beam is set to a maximum of the bottom power level for a time length greater than 1T and less than 2T, where T represents the time length of one period of a reference clock in a data signal.

3. A record carrier recording method for forming marks and lands on a recording surface of the record carrier by irradiating a radiation beam onto the recording surface of the record carrier, said recording method comprising the steps of:
setting the radiation beam, for each mark to be recorded, to at least one constant or pulsed write power level capable of forming a mark during a mark period;
setting the radiation beam, for each land between the marks, to at least one bottom power level incapable of forming a mark during a land period; and
raising the bottom power level to an intermediate power level during an intermediate period,
wherein during a land start period and/or a land end period of said land period, the radiation beam is set to a maximum of the bottom power level for a time length of at least 0.5T, in particular, for a time length of between 1T and 2T, where T represents the time length of one period of a reference clock in a data signal, characterized in that during said land start period and/or said land end period, the bottom power level is lowered to a land power level.

4. A record carrier recording method for forming marks and lands on a recording surface of the record carrier by irradiating a radiation beam onto the recording surface of the record carrier, said recording method comprising the steps of:
setting the radiation beam, for each mark to be recorded, to at least one constant or pulsed write power level capable of forming a mark during a mark period; and
setting the radiation beam, for each land between the marks, to at least one bottom power level incapable of forming a mark during a land period,
wherein the method further comprises the step of:
raising the bottom power level to an intermediate power level during an intermediate period,
characterized in that said method further comprises the step of:

controlling the level of said intermediate power level and/or the duration of said intermediate period such that a signal-to-noise ratio of a data signal read from the record carrier is increased.

5. A record carrier recording device for recording data in the form of marks and lands on a recording surface of the record carrier by irradiating a radiation beam onto the recording surface of the record carrier, the recording device comprising:

a radiation source for providing the radiation beam; and control means for controlling the power of the radiation beam such that, for each mark to be recorded, the power is set to at least one constant or pulsed write power level capable of forming a mark during a mark period, and for each land between the marks, the power is set to at least one bottom power level incapable of forming a mark during a land period, wherein the control means controls the power of the radiation beam such that the bottom power level is raised to an intermediate power level during an intermediate period, characterized in that said intermediate power level is being set within a range of from 1.5 to 6, in particular, from 2 to 4, times the bottom power level.

6. A record carrier recording device for recording data in the form of marks and lands on a recording surface of the record carrier by irradiating a radiation beam onto the recording surface of the record carrier, the recording device comprising:

a radiation source for providing the radiation beam; and control means for controlling the power of the radiation beam such that, for each mark to be recorded, the power is set to at least one constant or pulsed write power level capable of forming a mark during a mark period, and for each land between the marks, the power is set to at least one bottom power level incapable of forming a mark during a land period, wherein the control means controls the power of the radiation beam such that the bottom power level is raised to an intermediate power level during an intermediate period, characterized in that the control means controls the power of the radiation beam such that during a land start period and/or a land end period of said land period, the power of the radiation beam is set to a maximum of the bottom power level for a time length greater than 1T and less than 2T, where T represents the time length of one period of a reference clock in a data signal.

7. A record carrier recording device for recording data in the form of marks and lands on a recording surface of the record carrier by irradiating a radiation beam onto the recording surface of the record carrier, the recording device comprising:

a radiation source for providing the radiation beam; and control means for controlling the power of the radiation beam such that, for each mark to be recorded, the power is set to at least one constant or pulsed write power level capable of forming a mark during a mark period, and for each land between the marks, the power is set to at least one bottom power level incapable of forming a mark during a land period, wherein the control means controls the power of the radiation beam such that the bottom power level is raised to an intermediate power level during an intermediate period, wherein the control means controls the power of the radiation beam such that during a land start period and/or a land end period of said land period, the power of the radiation beam is set to a maximum of the bottom power level for a time length of at least 0.5T, in particular, for a time length of between 1T and 2T, where T represents the time length of one period of a reference clock in a data signal, characterized in that the control means controls the power of the radiation beam such that during said land start period and/or said land end period, the bottom power level is lowered to a land power level.

8. A record carrier recording device for recording data in the form of marks and lands on a recording surface of the record carrier by irradiating a radiation beam onto the recording surface of the record carrier, the recording device comprising:

a radiation source for providing the radiation beam; and control means for controlling the power of the radiation beam such that, for each mark to be recorded, the power is set to at least one constant or pulsed write power level capable of forming a mark during a mark period, and for each land between the marks, the power is set to at least one bottom power level incapable of forming a mark during a land period, wherein the control means controls the power of the radiation beam such that the bottom power level is raised to an intermediate power level during an intermediate period, characterized in that said recording device further comprises:

jitter control means for minimizing the jitter in a data signal read from the record carrier while recording the data on the record carrier by controlling the power of the radiation beam and/or by controlling the duration and time length of the power levels.

* * * * *